US 12,408,658 B1
Sep. 9, 2025

(12) United States Patent
Campbell

(54) ANIMATED WATERFOWL DECOY

(71) Applicant: Sean Campbell, Jamaica, NY (US)

(72) Inventor: Sean Campbell, Jamaica, NY (US)

(*) Notice: Subject to any disclaimer, the term of this patent is extended or adjusted under 35 U.S.C. 154(b) by 0 days.

(21) Appl. No.: 18/636,408

(22) Filed: Apr. 16, 2024

Related U.S. Application Data

(63) Continuation-in-part of application No. 18/602,161, filed on Mar. 12, 2024.

(51) Int. Cl.
*A01M 31/06* (2006.01)

(52) U.S. Cl.
CPC .................. *A01M 31/06* (2013.01)

(58) Field of Classification Search
CPC ...................................... A01M 31/06
See application file for complete search history.

(56) References Cited

U.S. PATENT DOCUMENTS

| | | | | |
|---|---|---|---|---|
| 1,110,245 | A * | 9/1914 | Vaughan | A01M 31/06 43/3 |
| 2,583,400 | A * | 1/1952 | Wade | A01M 31/004 446/188 |
| 2,747,314 | A * | 5/1956 | McGregor | A01M 31/06 43/3 |
| 3,034,245 | A * | 5/1962 | Lynch | A01M 31/06 43/3 |
| 4,056,890 | A * | 11/1977 | Dembski | A01M 31/06 43/3 |
| 6,079,140 | A * | 6/2000 | Brock, IV | A01M 31/06 43/3 |
| 6,553,709 | B1 * | 4/2003 | Owen | A01M 31/06 446/153 |
| 7,472,508 | B2 | 1/2009 | Myers, IV | |
| 8,266,836 | B2 | 9/2012 | Ware | |
| 9,265,245 | B2 * | 2/2016 | Marsh | A01M 31/06 |
| 9,924,711 | B1 | 3/2018 | Gill | |
| 10,212,929 | B2 | 2/2019 | Janzen, Jr. | |
| 10,292,380 | B1 * | 5/2019 | DeLoach, III | H04W 4/024 |
| 10,321,674 | B1 | 6/2019 | Goodwin | |
| 10,765,107 | B2 | 9/2020 | Peoples | |
| D999,875 | S | 9/2023 | Uptegrove | |
| 2003/0061754 | A1 * | 4/2003 | Cicoff | A01M 31/06 43/2 |
| 2004/0010957 | A1 * | 1/2004 | Corbiere, Jr. | A01M 31/06 43/3 |
| 2004/0025770 | A1 * | 2/2004 | Saunoris | B63B 34/05 114/40 |
| 2011/0067289 | A1 | 3/2011 | Lane | |

(Continued)

FOREIGN PATENT DOCUMENTS

CA 3065593 6/2020

*Primary Examiner* — Christopher P Ellis
(74) *Attorney, Agent, or Firm* — Kyle A. Fletcher, Esq.

(57) ABSTRACT

The animated waterfowl decoy is configured for use with waterfowl. The animated waterfowl decoy forms a lure that visually and audibly attracts waterfowl to the location of the lure. The animated waterfowl decoy incorporates a decoy structure and a control circuit. The control circuit mounts in the decoy structure. The decoy structure generates the sentiments that visually attract the waterfowl to the animated waterfowl decoy. The control circuit generates the sentiments that audibly attract that waterfowl to the animated waterfowl decoy.

14 Claims, 6 Drawing Sheets

(56) References Cited

U.S. PATENT DOCUMENTS

| | | | | |
|---|---|---|---|---|
| 2012/0240447 | A1* | 9/2012 | Gurner, III | F16M 11/18 |
| | | | | 248/176.1 |
| 2017/0231218 | A1* | 8/2017 | Turner | B63H 5/02 |
| | | | | 43/2 |
| 2018/0103633 | A1* | 4/2018 | Fobian | A01M 31/06 |
| 2019/0037830 | A1* | 2/2019 | Cagle | A01M 31/06 |
| 2020/0008418 | A1* | 1/2020 | Peoples | A01M 31/06 |
| 2020/0077640 | A1* | 3/2020 | Jarboe | A01M 31/06 |
| 2020/0383316 | A1* | 12/2020 | Noe | A01M 31/06 |
| 2021/0037808 | A1* | 2/2021 | Noe | A01M 31/06 |
| 2021/0141379 | A1* | 5/2021 | DeLoach, III | G08C 17/02 |
| 2023/0380411 | A1* | 11/2023 | Baskfield | H05K 5/061 |
| 2024/0114892 | A1* | 4/2024 | Bruns | A63H 23/10 |

* cited by examiner

US 12,408,658 B1

ANIMATED WATERFOWL DECOY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of game callers. (A01M31/004)

SUMMARY OF INVENTION

The animated waterfowl decoy is configured for use with waterfowl. By waterfowl is meant a bird that is considered to be a game animal. The animated waterfowl decoy forms a lure that visually and audibly attracts waterfowl to the location of the lure. The animated waterfowl decoy comprises a decoy structure and a control circuit. The control circuit mounts in the decoy structure. The decoy structure generates the sentiments that visually attract the waterfowl to the animated waterfowl decoy. The control circuit generates the sentiments that audibly attract that waterfowl to the animated waterfowl decoy.

These together with additional objects, features and advantages of the animated waterfowl decoy will be readily apparent to those of ordinary skill in the art upon reading the following detailed description of the presently preferred, but nonetheless illustrative, embodiments when taken in conjunction with the accompanying drawings.

In this respect, before explaining the current embodiments of the animated waterfowl decoy in detail, it is to be understood that the animated waterfowl decoy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animated waterfowl decoy.

It is therefore important that the claims be regarded as including such equivalent construction insofar as they do not depart from the spirit and scope of the animated waterfowl decoy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
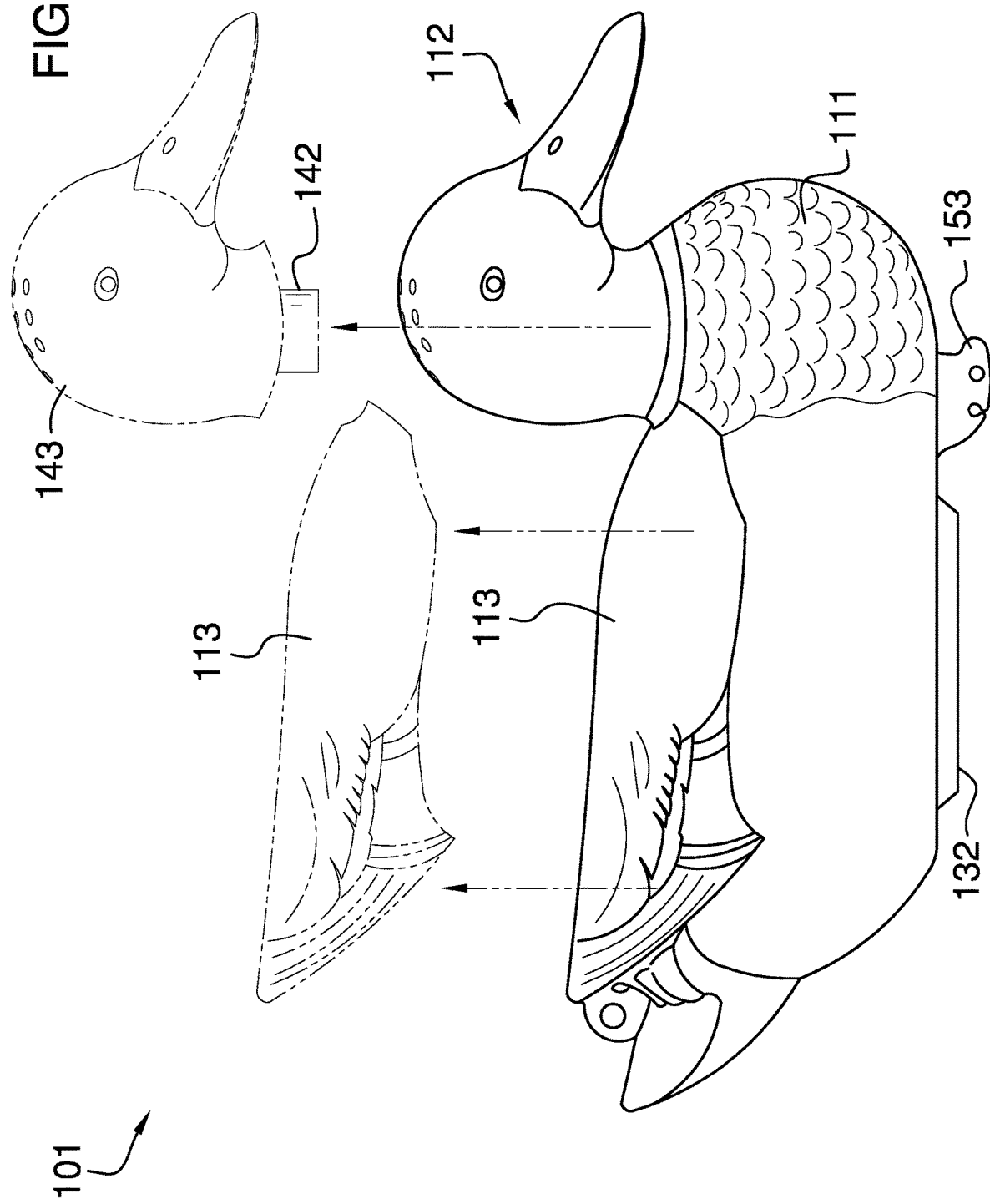
FIG. 1 is an exploded view of an embodiment of the disclosure.
Figure 2:
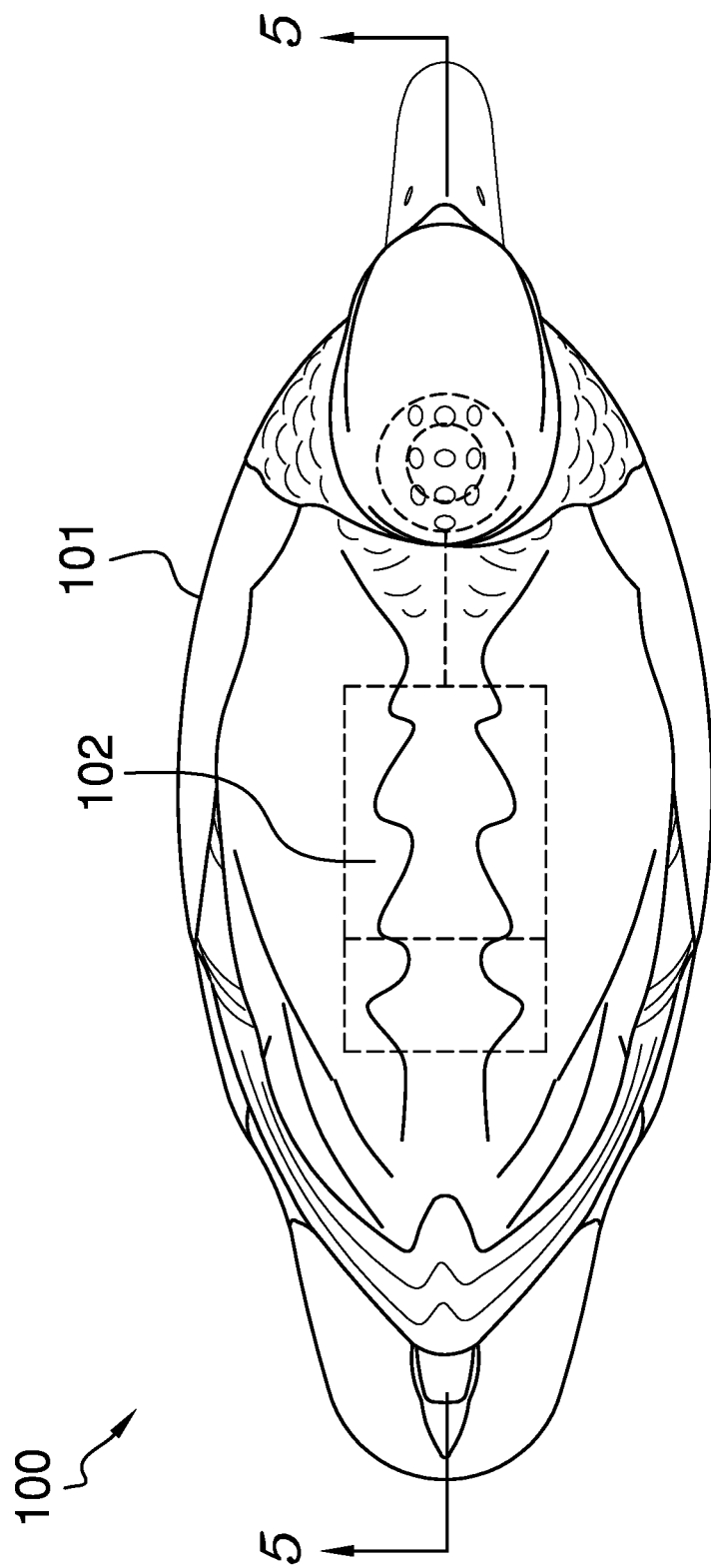
FIG. 2 is a top view of an embodiment of the disclosure.
Figure 3:
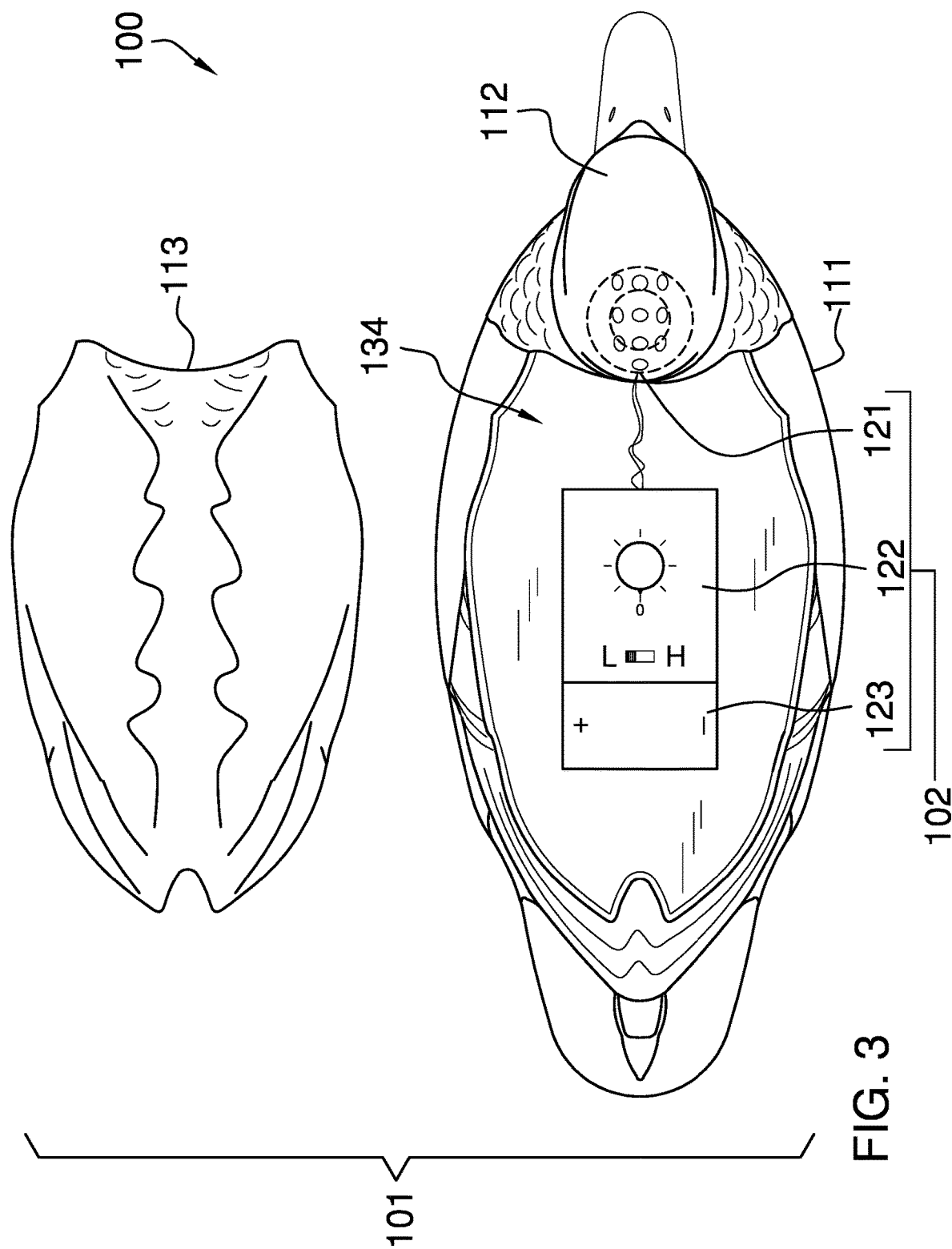
FIG. 3 is an exploded view of an embodiment of the disclosure.
Figure 4:
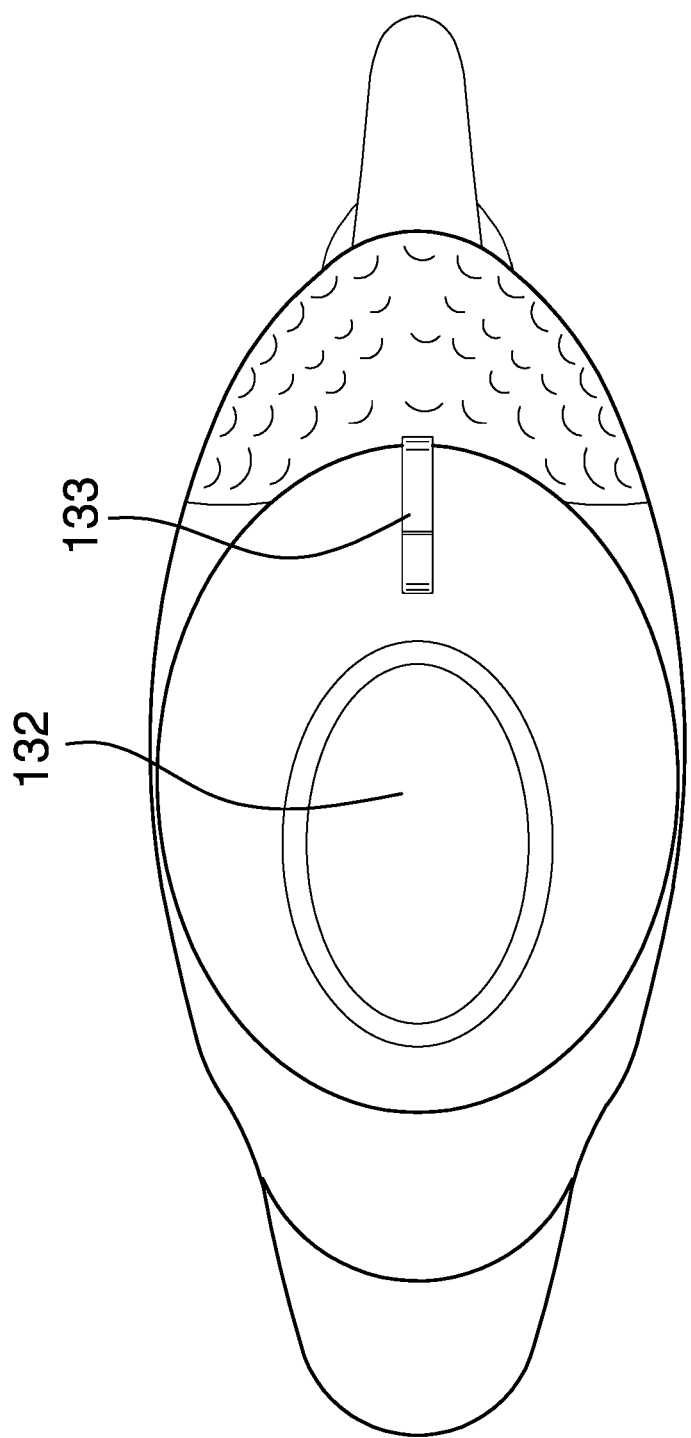
FIG. 4 is a bottom view of an embodiment of the disclosure.
Figure 5:
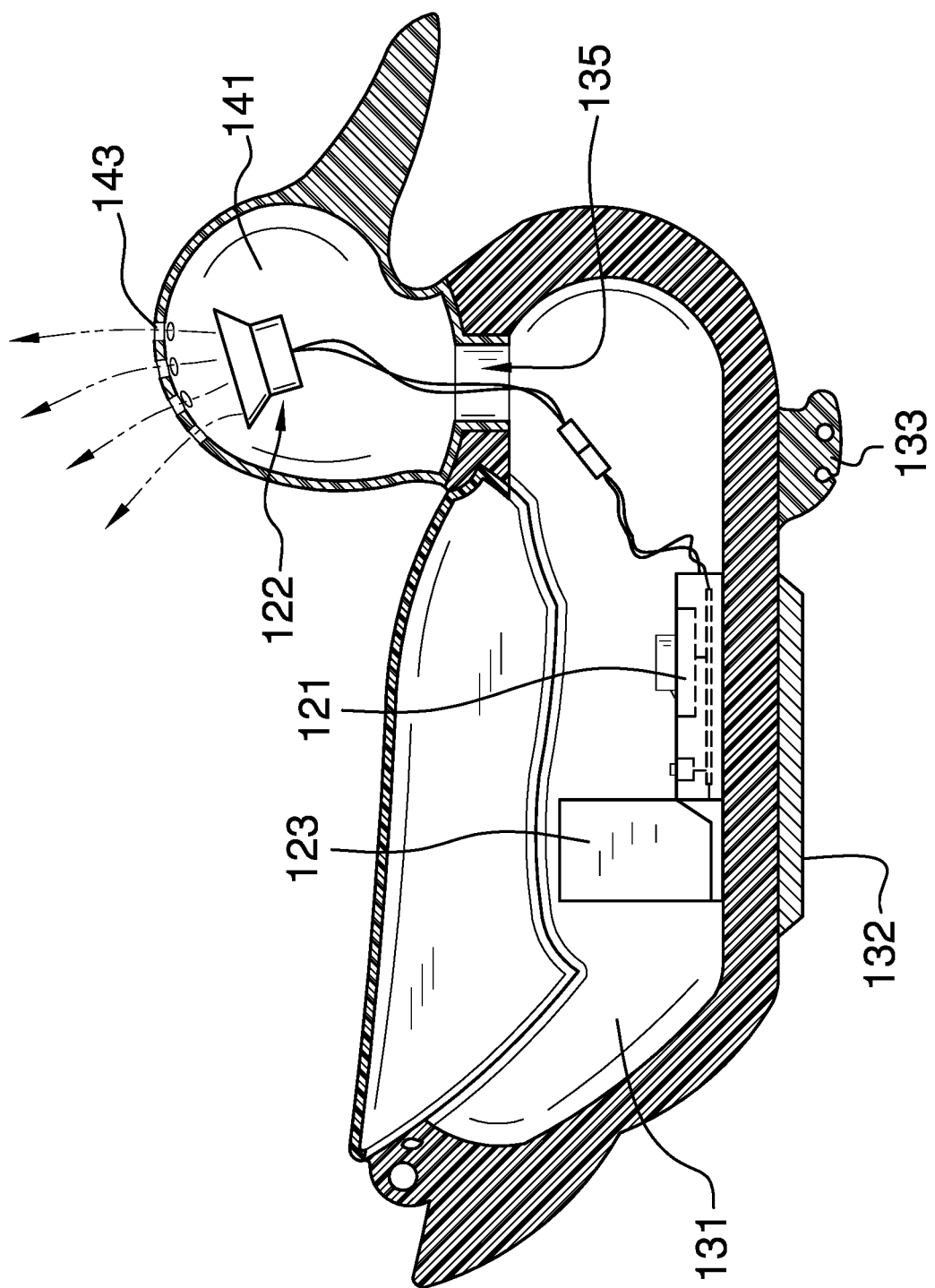
FIG. 5 is a cross-sectional view of an embodiment of the disclosure across 5-5 as shown in FIG. 1.
Figure 6:
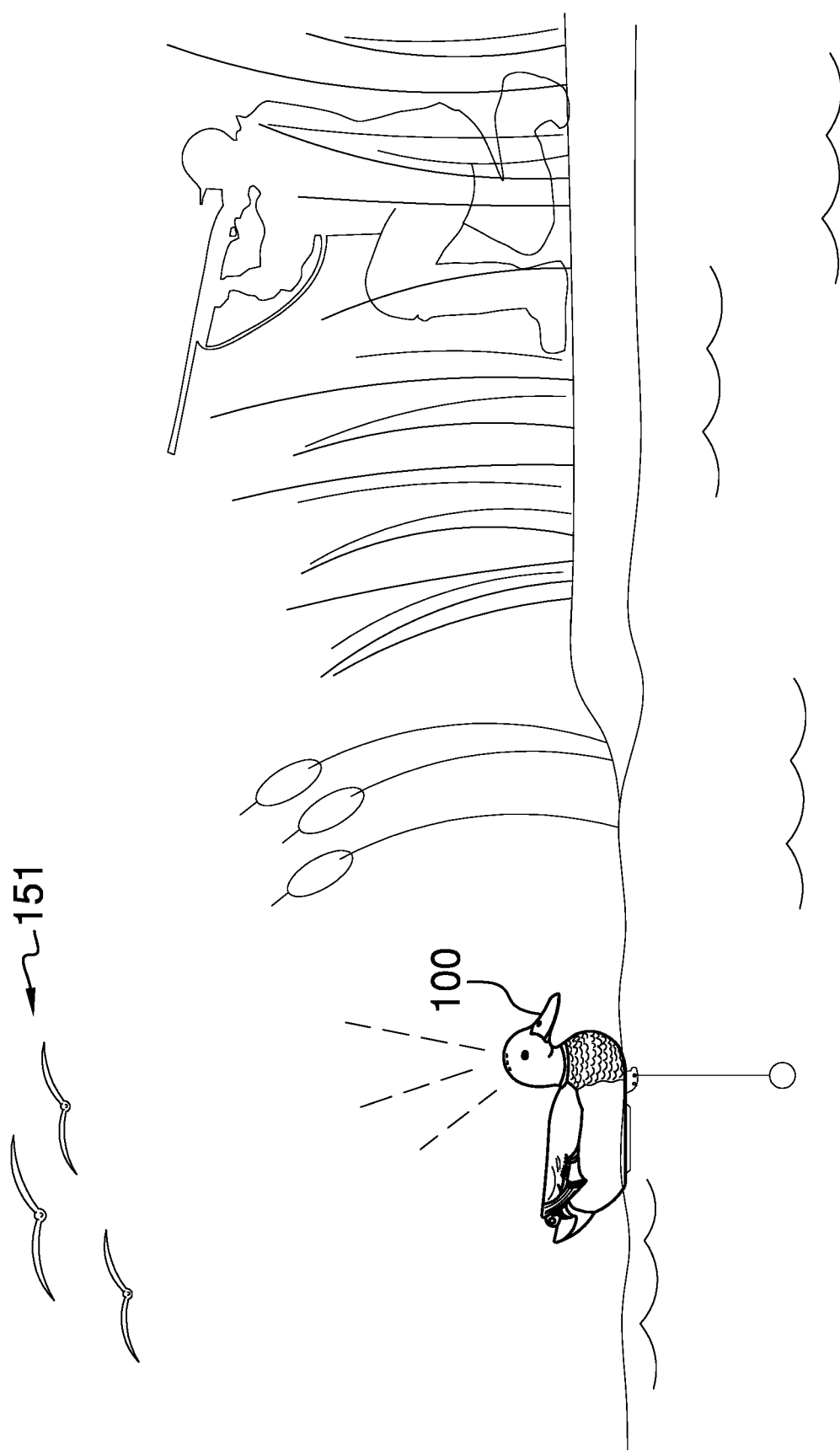
FIG. 6 is an in-use view of an alternate embodiment of the disclosure.

Detailed reference will now be made to one or more potential embodiments of the disclosure, which are illustrated in FIGS. 1 through 6.

The animated waterfowl decoy 100 (hereinafter invention) is configured for use with waterfowl. By waterfowl 151 is meant a bird that is considered to be a game animal. The invention 100 forms a lure that visually and audibly attracts waterfowl 151 to the location of the lure. The invention 100 comprises a decoy structure 101 and a control circuit 102. The control circuit 102 mounts in the decoy structure 101. The decoy structure 101 generates the sentiments that visually attract the waterfowl 151 to the invention 100. The control circuit 102 generates the sentiments that audibly attract that waterfowl 151 to the invention 100.

The decoy structure 101 is a puppet. The decoy structure 101 presents the visual appearance of a waterfowl 151. Specifically, the decoy structure 101 visually presents indicia that generate a sentiment of attraction to the waterfowl 151. The decoy structure 101 visually attracts the waterfowl 151 to the invention 100. The decoy structure 101 is a buoyant structure that floats in water. The decoy structure 101 attracts flying waterfowl 151 towards the surface of the water. The decoy structure 101 comprises a body puppet substructure 111, a head puppet substructure 112, and a superior lid structure 113.

The body puppet substructure 111 is a physical structure. The body puppet substructure 111 is a hollow structure. The body puppet substructure 111 is a buoyant structure that floats in water. The body puppet substructure 111 forms a substructure of the decoy structure 101. The control circuit 102 mounts in the body puppet substructure 111. The head puppet substructure attaches to the body puppet substructure 111. The superior lid structure 113 attaches to the body puppet substructure 111. The body puppet substructure 111 and the superior lid structure 113 combine to present the visual appearance of the body of the waterfowl 151. The body puppet substructure 111, the superior lid structure 113, and the head puppet substructure 112 combine to present the visual appearance of the waterfowl 151. The body puppet substructure 111 simulates the appearance of the inferior surfaces of the body of the waterfowl 151.

The body puppet substructure 111 further comprises a body cavity 131, a ballast structure 132, an anchor point 133, a superior aperture 134, and a neck mortise 135. The body cavity 131 is a negative space that is formed in the body puppet substructure 111. The body cavity 131 forms the negative space where the control circuit 102 is contained.

The ballast structure 132 is a ballast that attaches to the inferior surface of the body puppet substructure 111. The ballast structure 132 remains submerged beneath the surface of the water when the decoy structure 101 floats in the water. The ballast structure 132 lowers the center of mass of the decoy structure 101 towards the water. The anchor point 133 forms an anchor point mounted on the inferior surface of the body puppet substructure 111. The anchor point 133 attaches a tether line or an additional ballast mass to the body puppet substructure 111.

The superior aperture 134 is an aperture that is formed in the superior surface of the body puppet substructure 111. The superior aperture 134 provides access into the body cavity 131. The neck mortise 135 is an aperture that is formed in the body puppet substructure 111. The neck mortise 135 forms the structure of the body puppet substructure 111 that the head puppet substructure 112 attaches to.

The head puppet substructure 112 is a physical structure. The head puppet substructure 112 is a hollow structure. The head puppet substructure 112 forms a substructure of the decoy structure 101. The head puppet substructure 112 simulates the appearance of the head of the waterfowl 151. The head puppet substructure 112 forms a fluidic connection with the body puppet substructure 111. The head puppet substructure 112 receives the announced audible simulation generated by the control circuit from the body puppet substructure 111. The head puppet 13 substructure 112 transports the announced audible simulation to the environment.

The head puppet substructure 112 comprises a head cavity 141, a neck tenon 142, and a plurality of acoustic apertures 143.

The head cavity 141 is a negative space that is formed in the head puppet substructure 112. The head cavity 141 forms an acoustic structure that transports the audible simulation of the waterfowl 151 from the neck tenon 142 to the plurality of acoustic apertures 143.

The neck tenon 142 is a hollow tubular structure. The neck tenon 142 attaches the head puppet substructure 112 to the body puppet substructure 111. The neck tenon 142 forms a tenon structure that inserts into the neck mortise 135 of the body puppet substructure 111. The neck tenon 142 forms an acoustic structure that transports the audible simulation generated by the control circuit 102 into the head cavity 141.

The plurality of acoustic apertures 143 forms a plurality of apertures that are formed through the exterior surface of the head puppet substructure 112. The plurality of acoustic apertures 143 forms a fluidic connection between the head cavity 141 and the environment. The plurality of acoustic apertures 143 forms the acoustic structure that releases the audible simulation of the waterfowl 151 into the environment.

The superior lid structure 113 forms a substructure of the decoy structure 101. The superior lid structure 113 forms a substructure of the decoy structure 101. The superior lid structure 113 simulates the appearance of the superior surfaces of the body of the waterfowl 151. The superior lid structure encloses the superior aperture 134 of the body puppet substructure 111. The superior lid structure 113 controls the access into the hollow interior of the body puppet substructure 111.

The control circuit 102 is an electric circuit. The control circuit 102 announces an audible simulation of the waterfowl 151. Specifically, the control circuit 102 audibly announces indicia that generate a sentiment of attraction to the waterfowl 151. The control circuit 102 audibly attracts the waterfowl 151 to the decoy structure 101. The control circuit 102 comprises a timing circuit 121, a speaker circuit 122, and a power circuit 123. The timing circuit 121, the speaker circuit 122, and the power circuit 123 are electrically interconnected.

The timing circuit 121 is a timing device. The timing circuit 121 is an electric circuit. The timing circuit 121 electrically connects to the speaker circuit 122. The timing circuit 121 controls the operation of the speaker circuit 122. The timing circuit 121 transmits an electric signal to the speaker circuit 122 that initiates speaker circuit 122 to announce the audible simulation of the waterfowl 151. The timing circuit 121 transmits the electric signal at regular intervals. The interval duration between the electric signals transmitted by the timing circuit 121 is selected to emulate the natural vocal cadence of the waterfowl 151.

The speaker circuit 122 is an electric circuit. The speaker circuit 122 is a transducer. The operation of the speaker circuit 122 is initiated by the electric signal generated by the timing circuit 121. Once initiated, the speaker circuit 122 converts electric energy into an audible sound. The audible sound generated by the speaker circuit 122 announces the audible simulation of the waterfowl 151. The speaker circuit 122 releases the audible simulation of the speaker circuit 122 into the neck tenon 142 of the head puppet substructure 112 of the decoy structure 101. The neck tenon 142 transports the announced audible simulation into the head cavity 141. The generated audible sound is then transported through the head cavity 141 to the plurality of acoustic apertures 143 for release into the environment.

The power circuit 123 is an electrochemical device. The power circuit 123 converts chemical potential energy into electric energy. The power circuit 123 electrically connects to the timing circuit 121. The power circuit 123 provides the timing circuit 121 with the electric energy necessary for the operation of the timing circuit 121. The power circuit 123 electrically connects to the speaker circuit 122. The power circuit 123 provides the speaker circuit 122 with the electric energy necessary for the operation of the speaker circuit 122.

The following definitions were used in this disclosure:

Acoustic: As used in this disclosure, as used in this disclosure, acoustic refers to the generation, detection, and transmission of wave based energy over a frequency range of roughly 10 Hz to 25 kHz.

Anchor: As used in this disclosure, anchor means to hold an object firmly or securely.

Anchor Point: As used in this disclosure, an anchor point is a location to which a first object can be securely attached to a second object.

Animal: As used in this disclosure, an animal is a biological organism that consumes organic material as its primary energy source for metabolism, requires oxygen for its primary metabolic processes, reproduces sexually, and forms tissues.

Announce: As used in this disclosure, to announce means to generate audible sounds over a transducer.

Appropriate Authority: As used in this disclosure, an appropriate authority is a previously determined person or organization that is designated to send and receive alarm or other notification messages regarding a monitored system or activity.

Audio: As used in this disclosure, audio refers to the reproduction of a sound that simulates the sound that was originally created. See acoustic.

Audio Device: As used in this disclosure, an audio device is a device that generates audible sound waves.

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted into audible sounds by an audio device such as a speaker.

Ballast: As used in this disclosure, ballast refers to an inert and heavy subcomponent of a structure that: a) lowers the center of mass of the structure; and, b) stabilizes the structure so that the structure is difficult to move or rotate. The weight of the ballast is often formed from a bulk solid material.

Battery: As used in this disclosure, a battery is a chemical device consisting of one or more cells, in which chemical energy is converted into electricity and used as a source of power. Batteries are commonly defined with a positive terminal and a negative terminal.

Bird: As used in this disclosure, a bird refers to an animal that is: a) a vertebrate; b) warm-blooded; c) reproduces by laying eggs; and, d) has a beak and feathers.

Buoyancy: As used in this disclosure, buoyancy refers to a property of an object that floats in a liquid. The object that floats in the liquid is referred to as buoyant. Buoyancy specifically refers to the situation where the mass of the liquid that is displaced when a buoyant object is placed in the liquid is greater than the mass of the object itself. In this instance, the pressure of the displaced liquid will raise the buoyant object such that the buoyant object floats.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Communication Link: As used in this disclosure, a communication link refers to the structured exchange of data between two objects.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Float: As used in this object, float refers to an object that is buoyant, or does not sink into a liquid.

Force of Gravity: As used in this disclosure, the force of gravity refers to a vector that indicates the direction of the pull of gravity on an object at or near the surface of the earth.

Game Animal: As used in this disclosure, a game animal is an animal that is targeted by a hunter or fisherperson during hunting or fishing activities.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Lure: As used in this disclosure, a lure is an object used to attract an animal towards the object. When the lure is a biological entity, the lure is often called bait.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Mortise: As used in this disclosure, a mortise is a prism-shaped negative space formed in an object that is designed to receive a geometrically similar object referred to as a tenon.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Puppet: As used in this disclosure, a puppet is a three-dimensional figure resembling a human, animal, plant, or symbolic image.

Remote Control: As used in this disclosure, remote control means the establishment of control of a device from a distance. Remote control is generally accomplished through the use of an electrical device that generates electrically based control signals that are transmitted via radio frequencies or other means to the device.

Roughly: As used in this disclosure, roughly refers to a comparison between two objects. Roughly means that the difference between one or more parameters of the two compared objects are not significantly different.

Sentiment: As used in this disclosure, a sentiment refers to a symbolic meaning or message that is communicated through the use of an object or an image, potentially including a text based image. See image and optical character recognition.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tenon: As used in this disclosure, a tenon is a prism-shaped structure that fits into a mortise such that the tenon is secured to the mortise. The tenon is geometrically similar to the mortise.

Tether: As used in this disclosure, a tether is a cord, line, webbing, or strap that is attached to an object to restrict its movement.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, the timing device is a device configured for use in measuring the passage of time. The timing device is often called a timer.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An animated waterfowl decoy comprising
a decoy structure and a control circuit;
wherein the control circuit mounts in the decoy structure;
wherein the animated waterfowl decoy is configured for use with waterfowl;
wherein the animated waterfowl decoy forms a lure that visually and audibly attracts waterfowl to the location of the lure;
wherein the control circuit announces an audible simulation of the waterfowl;
wherein the control circuit further controls the motion of the decoy structure across a body of water;
wherein the control circuit comprises a logic module, a communication module, a drive mechanism, a timing circuit, a speaker circuit, and a power circuit;
wherein the drive mechanism comprises a motor control circuit, a drive motor, a directional slewing motor, and a propeller structure;
wherein the propeller structure attaches to the drive motor;
wherein the logic module controls the operation of the motor control circuit;
wherein by controlling the operation of the motor control circuit is meant that the logic module transmits an electric signal containing the desired speed of rotation of the drive motor;
wherein by controlling the operation of the motor control circuit is meant that the logic module transmits an electric signal containing the desired direction of rotation of the drive motor.

2. The animated waterfowl decoy according to claim 1
wherein the decoy structure generates the sentiments that visually attract the waterfowl to the animated waterfowl decoy;
wherein the control circuit generates the sentiments that audibly attract that waterfowl to the animated waterfowl decoy.

3. The animated waterfowl decoy according to claim 2
wherein the decoy structure is a puppet;
wherein the decoy structure presents the visual appearance of a waterfowl;
wherein the decoy structure visually attracts the waterfowl to the animated waterfowl decoy;
wherein the decoy structure is a buoyant structure that floats in water.

4. The animated waterfowl decoy according to claim 3
wherein the control circuit is an electric circuit;
wherein by controlling the motion of the decoy structure is meant that: a) the control circuit controls the direction of motion of the decoy structure; b) the control circuit controls the speed of motion of the decoy structure; and, c) the control circuit generates the motive forces necessary to propel the decoy structure across the body of water.

5. The animated waterfowl decoy according to claim 4
wherein the decoy structure comprises a body puppet substructure, a head puppet substructure, and a superior lid structure;
wherein the head puppet substructure attaches to the body puppet substructure;
wherein the superior lid structure attaches to the body puppet substructure.

6. The animated waterfowl decoy according to claim 5
wherein the logic module, the communication module, the drive mechanism, the timing circuit, the speaker circuit, and the power circuit are electrically interconnected.

7. The animated waterfowl decoy according to claim 6
wherein the logic module is a programmable electronic device;
wherein the communication module further comprises a first wireless communication link and a remote control transmitter;
wherein the communication module forms the first wireless communication link with the remote control transmitter;
wherein the communication module receives a plurality of direct messaging facilities that are transmitted over the first wireless communication link from the remote control transmitter;
wherein the message contained in the direct messaging facility is intended to facilitate communication between the appropriate authority and the control circuit;
wherein specifically, the direct messaging facility: a) initiates the announcement of the audible simulation of the waterfowl; b) discontinues the announcement of the audible simulation of the waterfowl; and c) provides the logic module the desired speed and direction of the motion of the decoy structure.

8. The animated waterfowl decoy according to claim 7
wherein the remote control transmitter is an electric circuit;
wherein the remote control transmitter forms an interface with the control circuit;
wherein the remote control transmitter transmits the messaging facility over the first wireless communication link to the control circuit;
wherein the communication module receives the transmitted messaging facility and relays the received messaging facility to the logic module.

9. The animated waterfowl decoy according to claim 8
wherein the drive mechanism is an electromechanical device;
wherein the drive mechanism receives electric energy from the power circuit;
wherein the drive mechanism converts the electric energy into rotational energy;
wherein the drive mechanism converts the rotational energy into a fluid flow that moves the decoy structure across the surface of a body of water;
wherein the drive mechanism electrically connects to the logic module;
wherein the logic module controls the operation of the drive mechanism.

10. The animated waterfowl decoy according to claim 9
wherein the motor control circuit is an electric circuit;
wherein the motor control circuit is a motor controller;

wherein the motor control circuit electrically connects to the logic module;
wherein by controlling the operation of the motor control circuit is meant that the logic module transmits an electric signal containing the desired speed of rotation of the directional slewing motor;
wherein by controlling the operation of the motor control circuit is meant that the logic module transmits an electric signal containing the desired direction of rotation of the directional slewing motor;
wherein the motor control circuit physically controls the operation of the drive motor and the directional slewing motor;
wherein the motor control circuit controls the operation of the drive motor independently of the operation of the directional slewing motor;
wherein the motor control circuit controls the speed of rotation of the drive motor;
wherein the motor control circuit controls the direction of rotation of the drive motor;
wherein the motor control circuit controls the speed of rotation of the directional slewing motor;
wherein the motor control circuit controls the direction of rotation of the directional slewing motor.

11. The animated waterfowl decoy according to claim 10
wherein the drive motor is an electric motor;
wherein the drive motor mounts on the exterior surface of the body puppet substructure of the decoy structure such that the drive motor and the attached propeller structure are submerged beneath the body of water;
wherein the drive motor is an electromechanical device that converts electric energy into rotational energy;
wherein the drive motor transmits the converted rotational energy to the propeller structure;
wherein the directional slewing motor is an electric motor;
wherein the directional slewing motor is an electromechanical device that converts electric energy into rotational energy;
wherein the directional slewing motor transmits the converted rotational energy to the drive motor;
wherein the directional slewing motor rotates the drive motor around a vertically oriented axis of rotation;
wherein the directional slewing motor adjusts the direction of travel of the decoy structure on the body of water by rotating the drive motor to adjust the direction of the thrust generated by the propeller structure;
wherein the propeller structure is a propeller;
wherein the propeller structure attaches to the drive motor such that the center of the propeller structure aligns with the axis of rotation of the rotational energy generated by the drive motor;
wherein the propeller structure attaches to the drive motor such that the propeller structure rotates with the drive motor;
wherein the propeller structure converts the rotational energy received from the drive motor into a fluid flow that generates the thrust that moves the decoy structure across the body of water;
wherein the direction of the thrust generated by the propeller structure aligns with the axis of rotation of the drive motor.

12. The animated waterfowl decoy according to claim 11
wherein the logic module electrically connects to the timing circuit;
wherein the logic module controls the operation of the timing circuit;
wherein the logic module electrically connects to the speaker circuit;
wherein the logic module controls the operation of the speaker circuit;
wherein the timing circuit is a timing device;
wherein the timing circuit is an electric circuit;
wherein the timing circuit electrically connects to the logic module;
wherein the timing circuit controls the timing of the operation of the speaker circuit through the logic module;
wherein the timing circuit transmits an electric signal to the logic module that initiates the speaker circuit to announce the audible simulation of the waterfowl;
wherein the timing circuit transmits the electric signal at regular intervals;
wherein the interval duration between the electric signals transmitted by the timing circuit is selected to emulate the natural vocal cadence of the waterfowl;
wherein the speaker circuit is an electric circuit;
wherein the speaker circuit is a transducer;
wherein the operation of the speaker circuit is initiated by the logic module;
wherein once initiated, the speaker circuit converts electric energy received from the logic module into an audible sound;
wherein the audible sound generated by the speaker circuit announces the audible simulation of the waterfowl.

13. The animated waterfowl decoy according to claim 12
wherein the body puppet substructure is a physical structure;
wherein the body puppet substructure is a hollow structure;
wherein the body puppet substructure is a buoyant structure that floats in water;
wherein the body puppet substructure forms a substructure of the decoy structure;
wherein the control circuit mounts in the body puppet substructure.

14. The animated waterfowl decoy according to claim 13
wherein the head puppet substructure is a physical structure;
wherein the head puppet substructure is a hollow structure;
wherein the head puppet substructure forms a substructure of the decoy structure;
wherein the head puppet substructure forms a fluidic connection with the body puppet substructure;
wherein the head puppet substructure receives the announced audible simulation generated by the control circuit from the body puppet substructure;
wherein the head puppet substructure transports the announced audible simulation to the environment,
wherein the body puppet substructure further comprises a body cavity, an anchor point, a superior aperture, and a neck mortise;
wherein the body cavity is a negative space that is formed in the body puppet substructure;
wherein the body cavity forms the negative space where the control circuit is contained;
wherein the anchor point forms an anchor point mounted on the inferior surface of the body puppet substructure;
wherein the anchor point attaches a tether line or an additional ballast mass to the body puppet substructure;
wherein the superior aperture is an aperture that is formed in the superior surface of the body puppet substructure;

wherein the superior aperture provides access into the body cavity;

wherein the neck mortise is an aperture that is formed in the body puppet substructure;

wherein the neck mortise forms the structure of the body puppet substructure that the head puppet substructure attaches to, wherein the head puppet substructure comprises a head cavity, a neck tenon, and a plurality of acoustic apertures;

wherein the head cavity is a negative space that is formed in the head puppet substructure;

wherein the head cavity forms an acoustic structure that transports the audible simulation of the waterfowl from the neck tenon to the plurality of acoustic apertures;

wherein the neck tenon is a hollow tubular structure;

wherein the neck tenon attaches the head puppet substructure to the body puppet substructure;

wherein the neck tenon forms a tenon structure that inserts into the neck mortise of the body puppet substructure;

wherein the neck tenon forms an acoustic structure that transports the audible simulation generated by the control circuit into the head cavity;

wherein the plurality of acoustic apertures forms a plurality of apertures that are formed through the exterior surface of the head puppet substructure;

wherein the plurality of acoustic apertures forms a fluidic connection between the head cavity and the environment;

wherein the plurality of acoustic apertures forms the acoustic structure that releases the audible simulation of the waterfowl into the environment;

wherein the superior lid structure forms a substructure of the decoy structure;

wherein the superior lid structure forms a substructure of the decoy structure;

wherein the superior lid structure simulates the appearance of the superior surfaces of the body of the waterfowl;

wherein the superior lid structure encloses the superior aperture of the body puppet substructure;

wherein the superior lid structure controls the access into the hollow interior of the body puppet substructure.

\* \* \* \* \*